US011006386B2

(12) United States Patent
Tang

(10) Patent No.: US 11,006,386 B2
(45) Date of Patent: May 11, 2021

(54) PAGING METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/685,880

(22) Filed: Nov. 15, 2019

(65) Prior Publication Data
US 2020/0084750 A1 Mar. 12, 2020

Related U.S. Application Data

(63) Continuation of application No. PCT/CN2017/088318, filed on Jun. 14, 2017.

(51) Int. Cl.
*H04W 68/00* (2009.01)
*H04W 68/02* (2009.01)

(52) U.S. Cl.
CPC .................................. *H04W 68/02* (2013.01)

(58) Field of Classification Search
CPC ..... H04W 60/04; H04W 68/12; H04W 16/26; H04W 64/00; H04W 68/04; H04W 88/085; H04W 36/245; H04W 88/16; H04W 8/02; H04W 92/14; H04W 60/005; H04W 76/27; H04W 60/00; H04W 68/005; H04W 68/08; H04W 72/04; H04W 72/044;

(Continued)

(56) References Cited

U.S. PATENT DOCUMENTS 6,216,004 B1    4/2001  Tiedemann, Jr. et al.
8,626,206 B2    1/2014  Fang et al.
                (Continued)

FOREIGN PATENT DOCUMENTS

CN    103428853 A    12/2013
CN    104604311 A     5/2015
                (Continued)

OTHER PUBLICATIONS

NTT Docomo, Inc., 3GPP TSG RAN Meeting #77 RP-172115; Revised WID on New Radio Access Technology, Sapporo, Japan, Sep. 11-14, 2017.

(Continued)

*Primary Examiner* — Joseph Arevalo

(57) ABSTRACT

The present application provides paging methods and devices, which can reduce signaling overhead. A method comprises: determining a paging time of a first terminal device by using at least one first bit of a first identifier of the first terminal device; transmitting a paging message during the paging time; where the paging message carries identifier information of the first terminal device, and the identifier information is obtained based on at least one second bit, except the at least one first bit, of the first identifier of the first terminal device, or, the identifier information is obtained based on a second identifier of the first terminal device, where a length of the identifier information is shorter than the second identifier of the first terminal device.

14 Claims, 4 Drawing Sheets

(58) Field of Classification Search
CPC ... H04W 74/0866; H04W 88/14; H04W 8/06; H04W 8/22; H04W 8/24; H04W 92/10; H04W 92/24
USPC ......... 455/458, 404.1, 422.1, 466, 439, 453, 455/41.2, 451, 552.1, 411, 426.1, 560
See application file for complete search history.

(56) References Cited

U.S. PATENT DOCUMENTS

| | | | |
|---|---|---|---|
| 9,504,013 | B2 | 11/2016 | Ahluwalia et al. |
| 9,560,630 | B2 | 1/2017 | Merlin et al. |
| 2005/0277429 | A1* | 12/2005 | Laroia ................. H04W 68/025 455/458 |
| 2008/0057982 | A1 | 3/2008 | Willey |
| 2010/0318795 | A1* | 12/2010 | Haddad ................. H04W 12/06 713/168 |
| 2019/0289571 | A1* | 9/2019 | Park ...................... H04W 68/02 |
| 2020/0077362 | A1* | 3/2020 | Liu ...................... H04W 72/005 |
| 2020/0084746 | A1* | 3/2020 | Rune ................... H04W 68/005 |
| 2020/0092845 | A1* | 3/2020 | Cai ....................... H04W 68/02 |

FOREIGN PATENT DOCUMENTS

| | | |
|---|---|---|
| CN | 106304337 A | 1/2017 |
| CN | 103428853 B | 5/2017 |
| CN | 106851823 A | 6/2017 |
| CN | 106304337 B | 9/2019 |
| RU | 2452137 C2 | 5/2012 |

OTHER PUBLICATIONS

The first Office Action of corresponding Russian application No. 2019143198, dated Aug. 20, 2020.

The EESR of corresponding European application No. 17913982.9, dated Mar. 4, 2020.

Mediatek Inc:"Paging in NR with Beam Sweeping", 3GPP Draft; R2-1701331 Paging in NR With Beam Sweeping, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017 Feb. 3, 2017(Mar. 3, 2017), XP051222867.

Nokia Alcatel-Lucent Shanghai Bell:"Paging in NR at HF operation", 3GPP Draft, R2-168124 Paging in NR at HF Operation, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016 Nov. 13, 2016(Nov. 13, 2016), XP051177815.

Qualcomm Incorporated: "Consideration on NR paging", 3GPP Draft; R2-1704820 Consideration on NR Paging, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017(May 14, 2017), XP051275337.

Qualcomm Europe:"Paging mechanism", 3GPP Draft; R2-073995. 3rd Generation Partnership Project (3GPP), Mobile Competence Centre; 650, Route Des Lucioles; F-06921 Sophia-Antipolis Cedex; France, vol. RAN WG2, No. Shanghai, China; Oct. 2, 2007 Oct. 2, 2007(Oct. 2, 2007), XP050136636.

Huawei et al: Paging mechanism for high frequency, 3GPP Draft; R2-1704897 Paging Mechanism for High Frequency, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017(May 14, 2017), XP051275411.

LG Electronics: "Discussion on paging design in NR", 3GPP Draft; R1-1700461, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017(Jan. 16, 2017), XP051207994.

The first Office Action of corresponding Canadian application No. 3067468, dated Feb. 25, 2021.

* cited by examiner

PAGING METHOD, NETWORK DEVICE AND TERMINAL DEVICE

CROSS-REFERENCE TO RELATED APPLICATIONS

This application is a continuation of International Application No. PCT/CN2017/088318, filed on Jun. 14, 2017, the disclosure of which is hereby incorporated by reference in its entirety.

TECHNICAL FIELD

The embodiments of the present application relate to the field of communications, and in particular, to a paging method, a network device, and a terminal device.

BACKGROUND

When a terminal device is in an idle state, if a core network device needs to interact with the terminal device, the network side informs the terminal device by means of a paging message. At this time, the UE can perform the subsequent response only if it detects the paging message.

In a New Radio (NR) system, the demand for signaling overhead is high.

Therefore, how to reduce the signaling overhead in the paging process is becoming an urgent problem to be solved.

SUMMARY

The application provides paging methods and devices, which can reduce signaling overhead during a paging process.

In a first aspect, a paging method is provided, including:

determining a paging time of a first terminal device by using at least one first bit of a first identifier of the first terminal device;

transmitting a paging message during the paging time;

where the paging message carries identifier information of the first terminal device, and the identifier information is obtained based on at least one second bit, except the at least one first bit, of the first identifier of the first terminal device; or, the identifier information is obtained based on a second identifier of the first terminal device, where a length of the identifier information is shorter than the second identifier of the first terminal device.

With reference to the first aspect, in a possible implementation of the first aspect, the identifier information is calculated based on at least a part of bits of the second identifier of the first terminal device.

With reference to the first aspect or the foregoing possible implementation, in another possible implementation of the first aspect, the identifier information is equal to a part of bits of the second identifier of the first terminal device.

With reference to the first aspect or any of the foregoing possible implementations, in another possible implementation of the first aspect, the first identifier is an international mobile subscriber identity IMSI and the identifier information is obtained based on at least one second bit of the IMSI of the first terminal device.

With reference to the first aspect or any of the foregoing possible implementations, in another possible implementation of the first aspect, the at least one first bit is a lowest bit of the first identifier; and the at least one second bit is a lowest bit, except the at least one first bit, of the first identifier.

With reference to the first aspect or any of the foregoing possible implementations, in another possible implementation of the first aspect, the first identifier is an IMSI, and the second identifier is a serving temporary mobile subscriber identity S-TMSI allocated by a core network, and the identifier information is obtained based on the S-TMSI of the first terminal device.

With reference to the first aspect or any of the foregoing possible implementations, in another possible implementation of the first aspect, the method further includes:

receiving a first paging response which is transmitted by at least one terminal device in response to the paging message, where the first paging response includes a first identifier or a second identifier of each terminal device of the at least one terminal device;

determining, according to the first identifier or the second identifier of each terminal device of the at least one terminal device, the first terminal device from the at least one terminal device;

transmitting a first feedback message to the first terminal device and/or other terminal devices except the first terminal device, where the first feedback message is used to indicate whether the paging message is a paging of a receiving end of the first feedback message.

With reference to the first aspect or any of the foregoing possible implementations, in another possible implementation of the first aspect, the method further includes:

receiving first paging responses transmitted by multiple terminal devices in response to the paging message;

transmitting a second feedback message to each terminal device of the multiple terminal devices; where when the identifier information is obtained based on the second bit, except the at least one first bit, of the first identifier, the second feedback message carries other bits except the first bit and the second bit of the first identifier; or when the identifier information is obtained based on a part of bits of the second identifier, the second feedback message carries the second identifier or other bits except the part of the bits of the second identifier; or when the identifier information is calculated based on all the bits of the second identifier, the second feedback message carries the second identifier.

With reference to the first aspect or any of the foregoing possible implementations, in another possible implementation of the first aspect, the method further includes:

receiving, a second paging response transmitted by at least one terminal device, where the second paging response is used to indicate whether the paging message is a paging of a transmitting end of the second paging response.

With reference to the first aspect or any of the foregoing possible implementations, in another possible implementation of the first aspect, the transmitting a paging message during the paging time includes:

transmitting, during the paging time, the paging message by using multiple beams.

In a second aspect, a paging method is provided, including:

determining, by a terminal device, a paging time of the terminal device by using at least one first bit of a first identifier of the terminal device;

receiving a paging message during the paging time;

transmitting a first paging response when the paging message carries identifier information of the terminal device;

where the identifier information is obtained based on a second bit, except the at least one first bit, of the first identifier, or the identifier information is obtained based on a second identifier of the terminal device, where a length of the identifier information is shorter than the second identifier.

With reference with the second aspect, in a possible implementation of the second aspect, the identifier information is calculated based on at least a part of bits of the second identifier.

With reference to the second aspect or the foregoing possible implementation, in another possible implementation of the second aspect, the identifier information is equal to a part of bits of the second identifier.

With reference to the second aspect or any of the foregoing possible implementations, in another possible implementation of the second aspect, the first identifier is an international mobile subscriber identity IMSI and the identifier information is obtained based on at least one second bit of the IMSI of the terminal device.

With reference to the second aspect or any of the foregoing possible implementations, in another possible implementation of the second aspect, the at least one first bit is a lowest bit of the first identifier; and the at least one second bit is a lowest bit, except the at least one first bit, of the first identifier.

With reference to the second aspect or any of the foregoing possible implementations, in another possible implementation of the second aspect, the first identifier is an IMSI, and the second identifier is a serving temporary mobile subscriber identity, S-TMSI allocated by a core network, and the identifier information is obtained based on the S-TMSI of the terminal device.

With reference to the second aspect or any of the foregoing possible implementations, in another possible implementation of the second aspect, the first paging response includes the first identifier or the second identifier of the terminal device.

With reference to the second aspect or any of the foregoing possible implementations, in another possible implementation of the second aspect, the method further includes:

receiving a first feedback message transmitted by a network device, where the first feedback message is used to indicate that the paging message is a paging of the terminal device, or is used to indicate that the paging message is not a paging of the terminal device.

With reference to the second aspect or any of the foregoing possible implementations, in another possible implementation of the second aspect, the method further includes:

receiving a second feedback message transmitted by a network device;

when the paging message carries the identifier information obtained based on the second bit except the at least one first bit of the first identifier, transmitting a second paging response to the network device according to whether the second feedback message carries other bits except the first bit and the second bit; or when the paging message carries identifier information obtained based on a part of bits of the second identifier, transmitting the second paging response to the network device according to whether the second feedback message carries the second identifier or other bits except the part of the bits of the second identifier; or when the paging message carries identifier information calculated based on all the bits of the second identifier, transmitting the second paging response to the network device according to whether the second feedback message carries the second identifier.

In a third aspect, a network device is provided for performing the first aspect or any of the possible implementations of the first aspect described above. In particular, the network side device includes functional modules for performing the method of the first aspect or any of possible implementations the first aspect described above.

In a fourth aspect, a terminal device is provided for performing the method of second aspect or any of the possible implementations of the second aspect described above. In particular, the terminal device includes functional modules for performing the method of the second aspect or any of possible implementations the second aspect described above.

In a fifth aspect, a network device is provided, including a processor, a memory, and a transceiver. The processor, the memory, and the transceiver communicate with each other through an internal connection path, transferring control and/or data signals, such that the network device performs the method in the first aspect or any possible implementation of the first aspect.

In a fifth aspect, a terminal device is provided, including a processor, a memory, and a transceiver. The processor, the memory, and the transceiver communicate with each other through an internal connection path, transferring control and/or data signals, such that the terminal device performs the method in the second aspect or any possible implementation of the second aspect.

In a seventh aspect, a computer readable medium for storing a computer program is provided. The computer program includes instructions for performing the first aspect or any of the possible implementations of the first aspect described above.

In an eighth aspect, a computer readable medium for storing a computer program is provided. The computer program includes instructions for performing the second aspect or any of the possible implementations of the second aspect described above.

In a ninth aspect, a computer program product including instructions is provided, and when a computer runs the instructions of the computer program product, the computer performs the method in any of the first aspect or any of the possible implementations of the first aspect. In particular, the computer program product can be run on the network device of the third or fifth aspect above.

In a tenth aspect, a computer program product including instructions is provided, and when a computer runs the instructions of the computer program product, the computer performs the method in any of the first aspect or any of the possible implementations of the first aspect. In particular, the computer program product can be run on the terminal device of the fourth or sixth aspect above.

Therefore, in the embodiment of the present application, the identifier information of the terminal device, which is carried in the paging message, may be a part of bits of the identifier of the terminal device, or may be information that is obtained based on the identifier bits of the terminal device and is shorter than the identifier. As the length of the carried identifier information of the terminal device is short, the signaling overhead can be reduced.

DESCRIPTION OF EMBODIMENTS

The technical solutions in the embodiments of the present application will be clearly and completely described in the following with reference to the accompanying drawings in the embodiments.

It should be understood that the technical solutions of the embodiments of the present application can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS) or a worldwide interoperability for microwave access (WiMAX) communication system, a 5G system, or a new radio (NR) system.

In the embodiments of the present application, the terminal device may include, but is not limited to, a mobile station (MS), a mobile terminal, a mobile telephone, a user equipment (UE), a handset, a portable equipment, a vehicle, etc. The terminal device can communicate with one or more core networks via a radio access network (RAN), for example, the terminal device may be a mobile phone (or known as the "cell" telephone), a computer with wireless communication capabilities, etc. The terminal devices may further be a portable, pocket-sized, handheld, computer build-in or in-vehicle mobile device.

The network device involved in the embodiments of the present application is an apparatus deployed in a radio access network to provide a wireless communication function for a terminal device. The network device may be a base station, and the base station may include various forms of macro base station, micro base station, relay station, access point, and the like. The names of devices with base station functionality may vary with the systems applying different radio access technologies. For example, in an LTE network, the base station is called evolved NodeB (eNB or eNodeB) while in the 3rd generation (3G) network, it is called Node B.

Figure 1:
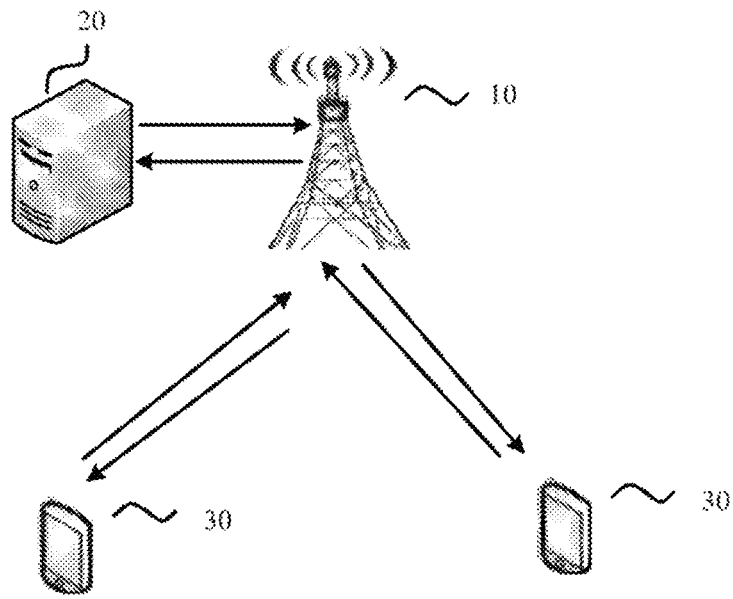
FIG. 1 is a schematic diagram of a wireless communication system according to an embodiment of the present application.

FIG. 1 is a schematic block diagram of a wireless communication system 100 according to an embodiment of the present application. As shown in FIG. 1, the system 100 may include a core network device 10, an access network device 20, and a terminal device 30.

When the terminal device 30 is in an idle state, if the core network device 10 needs to interact with the terminal device 30, the core network device 10 performs paging on the terminal device 30. If there are paging messages having a same paging time, then the paging messages can be aggregated by the access network device 20 into one paging message. Such paging message may carry a UE ID list, and the UE ID list may carry the identifier(s) (ID(s)) of one or more terminal devices. If the paging message received by the terminal device 30 has a UE ID list, the UE can use its own UE ID to try to match a UE ID in the UE ID list in the paging message, so as to determine whether it is being paged.

If the paging ID indicated in the paging message is a serving temporary mobile subscriber identity S-TMSI allocated by the core network, it is indicated that the paging is a normal service call; if the paging ID is the international mobile subscriber identification number IMSI, it is indicated that the current paging is an abnormal call and is used for network-side error recovery, and in this case the terminal device can restart an attach process.

In a discontinuous reception (DRX) cycle, the terminal device may first monitor a physical downlink control channel (PDCCH) for a paging radio network temporary identity (P-RNTI) only at a paging occasion (PO) on a corresponding paging frame (PF), and currently the P-RNTI uses a fixed value FFFE. If the P-RNTI is carried on the PDCCH, it is indicated that there is a paging message carried on a corresponding physical downlink shared channel (PDSCH). If there is a paging message carried on the corresponding PDSCH, the terminal device then receives the paging message on the PDSCH according to a PDSCH parameter indicated on the PDCCH. The paging message carried on the PDSCH includes identifier information of a terminal device, where the identifier information of the terminal device is used for the terminal device to determine whether the paging message carried on the PDSCH includes its own paging message. If the terminal device fails to parse out the P-RNTI on the PDCCH, it is no longer necessary for the terminal device to receive the PDSCH, and at this time the terminal device may enter sleep according to the DRX cycle. With this mechanism, in a DRX cycle, the terminal device can receive the PDCCH only at the time point when the PO appears, then receive the PDSCH as needed, and at other times the UE can sleep to achieve the purpose of power saving.

In the New Ratio (NR), the demand for the signaling overhead is high. For example, in the NR system, paging messages need to be transmitted by means of beams, and each paging message needs to be transmitted repeatedly on the beams in different directions so that the each paging message arrives at the terminal devices in different locations. Accordingly, the paging message of the same size needs to be repeatedly transmitted multiple times, thus enlarging the signaling overhead.

Therefore, the embodiment of the present application provides a solution that can reduce the signaling overhead.

Figure 2:
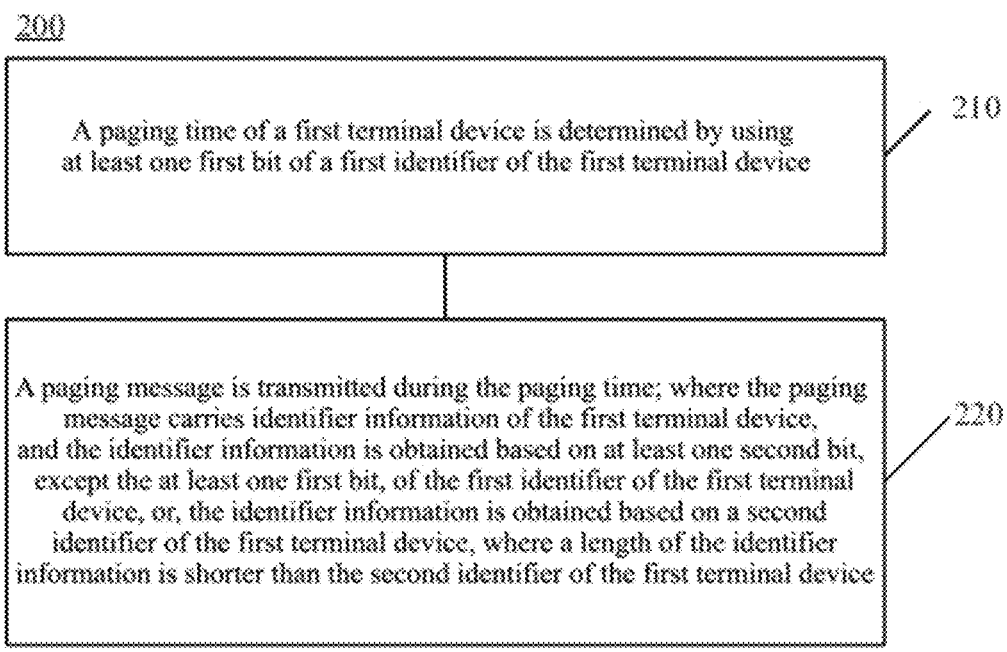
FIG. 2 is a schematic flowchart of a paging method according to an embodiment of the present application.

FIG. 2 illustrates a schematic flowchart of a paging method 200 according to an embodiment of the present application. As shown in FIG. 2, the method 200 includes at least some of the following.

In 210, a paging time of a first terminal device is determined by using at least one first bit of a first identifier of the first terminal device.

In an embodiment, the paging time may include a paging moment and/or a paging frame. The paging moment refers to a subframe (e.g., 1 ms) that may include a paging message, and the paging frame may refer to a radio frame (e.g., 10 ms) that may include one or more paging moments.

In an embodiment, the paging frame can be determined by Equation 1 below:

$$PF = SFN \bmod T = (T \operatorname{div} N) * (UE\_ID \bmod N) \qquad \text{Equation 1}$$

where SFN indicates a system frame number, the frame number where the terminal device is located; T=min(Tc, Tue), where Tc and Tue respectively indicate the paging cycle set by the core network and the wireless side; N: N=min(T, nB), nB is read from SIB2; UE_ID is included in an S1 paging message, and is calculated by IMSI modulo 1024.

In an embodiment, the paging moment can be determined by Equation 2 below:

$$i\_s = \text{floor}(UE\_ID/N) \bmod Ns \qquad \text{Equation 2}$$

where Ns=max(1, nB/T), with nB and T being obtained from SIB2. The UE_ID is obtained from the S1 message, and N is calculated from the information in the SIB2.

In an embodiment, the first identifier may be an IMSI of the terminal device, and the current paging may be a normal service call, or the current paging is an abnormal service call which is used for error recovery on the network side.

In an embodiment, the first identifier may be an S-TMSI of the terminal device, and the current paging may be used for a normal service call.

In an embodiment, the at least one first bit of the first identity may be at least one lowest bit of the IMSI.

In an embodiment, the quantity of bits is related to the value of N. In an embodiment, the at least one lowest bit may be the last 10 bits of the IMSI.

In 220, a paging message is transmitted during the paging time; where the paging message carries identifier information of the first terminal device, and the identifier information is obtained based on at least one second bit, except the at least one first bit, of the first identifier of the first terminal device, or, the identifier information is obtained based on a second identifier of the first terminal device, where a length of the identifier information is shorter than the second identifier of the first terminal device.

In an embodiment, when multiple terminal devices need to be paged at a certain paging time, a combined paging may be performed for the multiple devices, that is, the paging message may carry a list of the identifier information of the multiple terminal devices. The first terminal device may be any one of the multiple terminal devices.

In an embodiment, in the embodiment of the present application, the identifier information is obtained based on at least one second bit, except the at least one first bit, of the first identifier of the first terminal device.

In an embodiment, the at least one first bit is a lowest bit of the first identifier; and the at least one second bit is a lowest bit, except the at least one first bit, of the first identifier.

In an embodiment, the first identifier is an IMSI.

In an implementation, the identifier information is equal to the at least one second bit.

For example, the first identifier is the IMSI, and the IMSI may include a Mobile Country Code (MCC), a Mobile Network Code (MNC), and a Mobile Subscriber Identification Number (MSIN), where the MCC may occupy 3 bits of decimal digits, the MNC consists of 2 bits of decimal digits and is used to identify the mobile communication network to which the mobile subscriber belongs, and the MSIN can be used to identify a mobile subscriber in a mobile communication network and may include 10 bits of decimal digits. The at least one first bit used to determine the paging time may be the last M bits of the MSIN, and the at least one second bit used to generate the identifier information may be the S lowest bits except the M bits in the MSIN, where the sum of S and N may be less than or equal to 10.

In an implementation, the identifier information may be obtained by performing calculation on the at least one second bit.

For example, the at least one first bit used to determine the paging time may be the last M bits of the MSIN, and the S lowest bits except the M bits in the MSIN can be used to calculate the identifier information, where the sum of S and N may be less than or equal to 10.

In an embodiment, the first identifier is an IMSI, and the second identifier is a serving temporary mobile subscriber identity S-TMSI allocated by the core network, and the identifier information is obtained based on the S-TMSI of the first terminal device.

In an embodiment, in an embodiment of the present application, the identifier information is calculated based on a part of or all the bits of the second identifier of the first terminal device.

For example, the second identifier may be an S-TMSI, and all the bits of the S-TMSI may be used to calculate the identifier information, or a part of the bits of the S-TMSI may be used to calculate the identifier information.

In an embodiment, in an embodiment of the present application, the identifier information of the first terminal is equal to a part of the bits of the second identifier of the first terminal device.

In an embodiment, the identifier information of the first terminal device is equal to at least one lowest bit or at least one highest bit of the second identifier.

For example, the second identifier may be an S-TMSI, and a part of bits of the S-TMSI may be extracted as the identifier information of the first terminal device. For example, the highest 8 bits may be used for paging.

In an embodiment, in an embodiment of the present application, the network device may transmit a paging message to the terminal device by using multiple beams.

Figure 3:
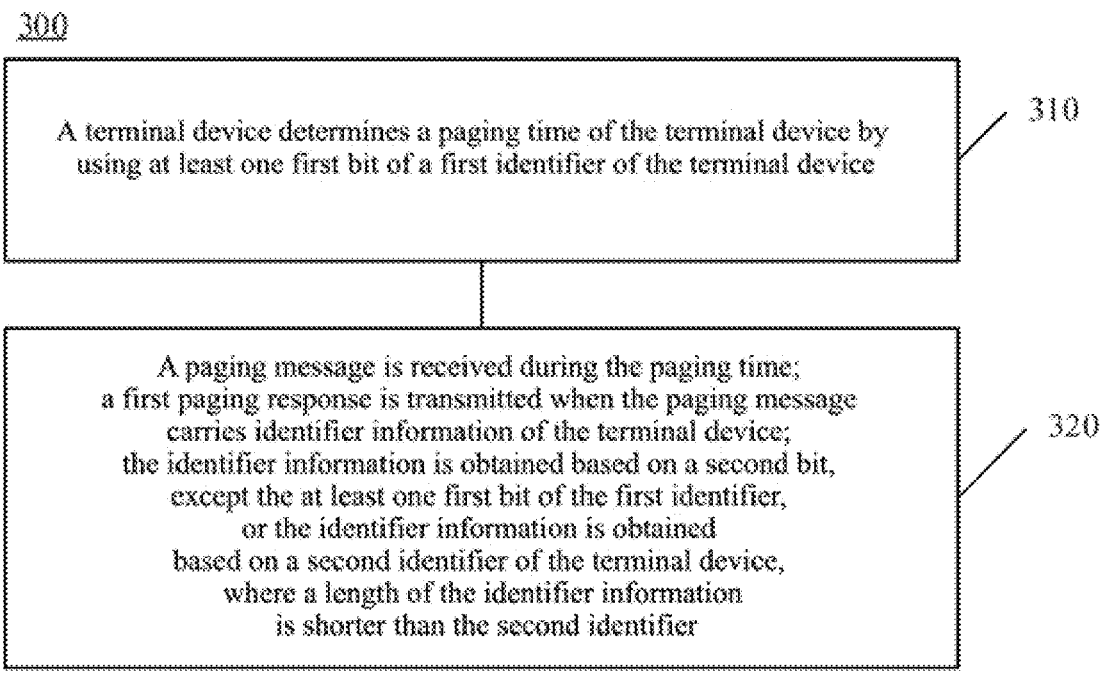
FIG. 3 is a schematic flowchart of a paging method according to an embodiment of the present application.

FIG. 3 is a schematic flowchart of a paging method 300 according to an embodiment of the present application. As shown in FIG. 3, the method 300 includes at least some of the following.

In 310, a terminal device determines a paging time of the terminal device by using at least one first bit of a first identifier of the terminal device.

In 320, a paging message is received during the paging time.

A first paging response is transmitted when the paging message carries identifier information of the terminal device.

The identifier information is obtained based on a second bit, except the at least one first bit of the first identifier, or the identifier information is obtained based on a second identifier of the terminal device, where a length of the identifier information is shorter than the second identifier.

In an embodiment, the identifier information is calculated based on at least a part of bits of the second identifier.

In an embodiment, the identifier information is equal to a part of bits of the second identifier.

In an embodiment, the first identifier is an international mobile subscriber identity IMSI, and the identifier information is obtained based on at least one second bit of the IMSI of the terminal device.

In an embodiment, the at least one first bit is a lowest bit of the first identifier; and the at least one second bit is a lowest bit, except the at least one first bit, of the first identifier.

In an embodiment, the first identifier is an IMSI, and the second identifier is a serving temporary mobile subscriber identity S-TMSI allocated by the core network, and the identifier information is obtained based on the S-TMSI of the terminal device.

In an embodiment, in the embodiment of the present application, as for the manner in which the terminal device determines the paging time and the identifier information of the terminal device in the method 300, reference may be made to the description of the network device, which will not be described herein again for brevity.

Therefore, in the embodiment of the present application, the identifier information of the terminal device, which is carried in the paging message, may be a part of bits of the identifier of the terminal device, or may be information that is obtained based on the identifier bits of the terminal device and is shorter than the identifier. As the length of the carried identifier information of the terminal device is short, the signaling overhead can be reduced.

In an embodiment, in an embodiment of the present application, in a Tracking Area (TA), there may be multiple terminal devices matching one single piece of identifier information. And in order to avoid the problem of paging errors, the present embodiment provides the following solutions.

In a solution, if the terminal device matches its own identifier information in the paging message, the first identifier or the second identifier of the terminal device may be carried in the first paging response which is transmitted in response to the paging message.

For example, when the paging message is used for a normal service call, the S-TMSI or IMSI may be carried in the first paging response.

For example, if the paging message is an abnormal call for recovery from errors on the network side, the IMSI may be carried in the first paging response.

When receiving the first paging response transmitted by the at least one terminal device, the network device may determine, according to the first identifier or the second identifier carried in the first paging response of each terminal device, the first terminal device from the at least one terminal device, where if the first paging response carries the first identifier or the second identifier that is equal to the first identifier or the second identifier of the first terminal device, thus the transmitting end of the first paging response is taken as the first terminal device, and a first feedback message is transmitted to the first terminal device for indicating that the paging message is directed to the terminal device, or a first feedback message is transmitted to other terminal devices except the first terminal device for indicating that the paging message is not directed to the terminal devices.

In a case where it is agreed that the first feedback message is transmitted to the target party of the paging message, if the terminal device receives the first feedback message, the terminal device then considers that the paging message is directed to the terminal device itself, and if the terminal device does not receive the first feedback message (for example, if it is not received within a predetermined time), the terminal device then considers that the paging message is not directed to the terminal device itself.

In a case where it is agreed that the first feedback message is transmitted to the non-target party of the paging message, if the terminal device receives the first feedback message, the terminal device then considers that the paging message is not directed to the terminal device itself, and if the terminal device does not receive the first feedback message (for example, if it is not received within a predetermined time), the terminal device then considers that the paging message is directed to the terminal device itself.

In a case where it is agreed that the first feedback message is transmitted to each terminal device that transmits the first paging response, the terminal device may determine whether the paging message is directed to the terminal device itself according to the value of a certain field in the first feedback message, for example, a value of 1 indicates that the paging message is directed to the terminal device itself, and a value of 0 indicates that the paging message is not directed to the terminal device itself.

In another solution, the first paging response does not carry the first identifier or the second identifier of the terminal device, and if the network device receives the first paging responses transmitted by multiple terminal devices in response to the paging message, then the network device transmits a second feedback message to each of the multiple terminal devices.

In an implementation, when the identifier information is obtained by using a second bit, except the at least one first bit, of the first identifier of the terminal device to be paged, the second feedback message carries other bits except the first bit and the second bit of the first identifier of the terminal device to be paged.

In another implementation, when the identifier information is obtained based on a part of bits of the second identifier of the terminal device to be paged, the second feedback message carries the second identifier or other bits except the part of the bits of the second identifier of the terminal device to be paged.

In another implementation, when the identifier information is calculated based on all bits of the second identifier of the terminal device to be paged, the second feedback message carries the second identifier of the terminal device to be paged.

After receiving the second feedback message transmitted by the network device, the terminal device may further determine, according to the content of the second feedback message, whether the paging message is directed to the terminal device itself.

In an implementation, when the paging message carries the identifier information obtained based on the second bit except the at least one first bit of the first identifier of the terminal device itself, then it is determined whether terminal device itself is the paging target according to whether the second feedback message carries other bits except the first bit and the second bit of the first identifier of the terminal device itself. For example, if the feedback message carries other bits except the first bit and the second bit of the first identifier of the terminal device itself, it can be determined that the terminal device itself is the paging target.

In another implementation, when the paging message carries the identifier information obtained based on a part of bits of the second identifier of the terminal device itself, it is determined whether the terminal device itself is the paging target according to whether the second feedback message carries the second identifier or other bits except the part of bits of the second identifier of the terminal device itself. For example, if the feedback message carries the second identifier or other bits except the part of bits of the second identifier of the terminal device itself, it can be determined that the terminal device itself is the paging target.

In another implementation, when the paging message carries the identifier information calculated based on all bits of the second identifier of the terminal device itself, it is determined whether the terminal device itself is the paging target according to whether the second feedback message carries the second identifier of the terminal device itself. For example, if the feedback message carries the second identifier of the terminal device itself, it can be determined that the terminal device itself is the paging target.

When the terminal device determines that itself is the paging target, it may transmit a second paging response to the network device for indicating that the terminal device is the paging target.

In an embodiment, when the terminal device determines that itself is not the paging target, it may transmit a second paging response to the network device for indicating that the terminal device is not the paging target.

Therefore, by means of the above two solutions, the problem of paging errors can be avoided.

Figure 4:
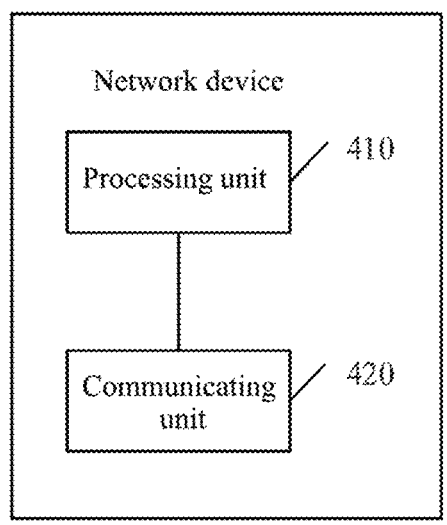
FIG. 4 is a schematic block diagram of a network device according to an embodiment of the present application.

FIG. 4 is a schematic block diagram of a network device 400 according to an embodiment. As shown in FIG. 4, the network device 400 includes a processing unit 410 and a communicating unit 420.

The processing unit 410 is configured to determine a paging time of a first terminal device by using at least one first bit of a first identifier of the first terminal device.

The communicating unit 420 is configured to transmit a paging message during the paging time.

The paging message carries identifier information of the first terminal device. The identifier information is obtained based on at least one second bit, except the at least one first bit, of the first identifier of the first terminal device, or, the identifier information is obtained based on a second identifier of the first terminal device, where a length of the identifier information is shorter than the second identifier of the first terminal device.

In an embodiment, the identifier information is calculated based on at least a part of bits of the second identifier of the first terminal device.

In an embodiment, the identifier information is equal to a part of bits of the second identifier of the first terminal device.

In an embodiment, the first identifier is an IMSI, and the identifier information is obtained based on at least one second bit of the IMSI of the first terminal device.

In an embodiment, the at least one first bit is a lowest bit of the first identifier; and the at least one second bit is a lowest bit, except the at least one first bit, of the first identifier.

In an embodiment, the first identifier is an IMSI, and the second identifier is an S-TMSI, and the identifier information is obtained based on the S-TMSI of the first terminal device.

In an embodiment, the communication unit 420 is further configured to: receive a first paging response which is transmitted by at least one terminal device in response to the paging message, where the first paging response includes a first identifier or a second identifier of each terminal device of the at least one terminal device;

the processing unit 410 is further configured to: determine, according to the first identifier or the second identifier of the each terminal device of the at least one terminal device, the first terminal device from the at least one terminal device; and the communication unit 420 is further configured to: transmit a first feedback message to the first terminal device and/or other terminal devices except the first terminal device, where the first feedback message is used to indicate whether the paging message is a paging of a receiving end of the first feedback message.

In an embodiment, the communicating unit 420 is further configured to:

receive first paging responses which are transmitted by multiple terminal devices in response to the paging message;

transmit a second feedback message to each terminal device of the multiple terminal devices; where when the identifier information is obtained based on the second bit, except the at least one first bit, of the first identifier, the second feedback message carries other bits except the first bit and the second bit of the first identifier; or when the identifier information is obtained based on a part of bits of the second identifier, the second feedback message carries the second identifier or other bits except the part of bits of the second identifier; or when the identifier information is calculated based on all bits of the second identifier, the second feedback message carries the second identifier.

In an embodiment, the communicating unit 420 is further configured to:

receive, a second paging response transmitted by at least one terminal device, where the second paging response is used to indicate whether the paging message is a paging of a transmitting end of the second paging response.

In an embodiment, the communicating unit 420 is further configured to:

transmit, during the paging time, the paging message by using multiple beams.

The network device 400 according to the embodiment of the present application may implement the operations performed by the network device in the method of the embodiment of the present application. For brevity, details are not described herein again.

Figure 5:
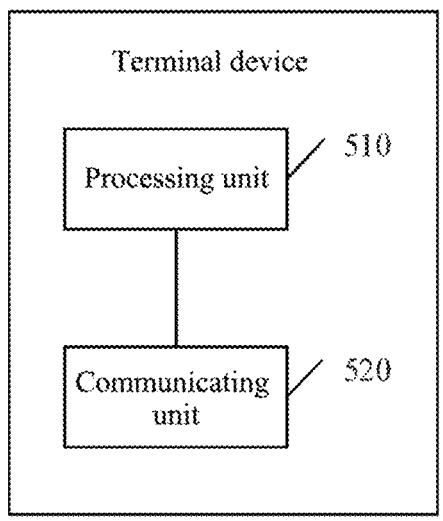
FIG. 5 is a schematic block diagram of a terminal device according to an embodiment of the present application.

FIG. 5 is a schematic block diagram of a terminal device 500 according to an embodiment of the present application. As shown in FIG. 5, the terminal device 500 includes a processing unit 510 and a communicating unit 520.

The processing unit 510 is configured to determine a paging time of the terminal device by using at least one first bit of a first identifier of the terminal device.

The communicating unit 520 is configured to: receive a paging message during the paging time; and transmit a first paging response when the paging message carries identifier information of the terminal device.

The identifier information is obtained based on a second bit, except the at least one first bit, of the first identifier, or the identifier information is obtained based on a second identifier of the terminal device, where the length of the identifier information is shorter than the second identifier.

In an embodiment, the identifier information is calculated based on at least a part of bits of the second identifier.

In an embodiment, the identifier information is equal to a part of bits of the second identifier.

In an embodiment, the first identifier is an international mobile subscriber identity IMSI, and the identifier information is obtained based on at least one second bit of the IMSI of the terminal device.

In an embodiment, the at least one first bit is a lowest bit of the first identifier; and the at least one second bit is a lowest bit, except the at least one first bit, of the first identifier.

In an embodiment, the first identifier is an IMSI, and the second identifier is a serving temporary mobile subscriber identity S-TMSI allocated by the core network, and the identifier information is obtained based on the S-TMSI of the terminal device.

In an embodiment, the first paging response includes the first identifier or the second identifier of the terminal device.

In an embodiment, the communicating unit 510 is further configured to:

receive a first feedback message transmitted by a network device, where the first feedback message is used to indicate that the paging message is a paging of the terminal device, or is used to indicate that the paging message is not a paging of the terminal device.

In an embodiment, the communicating unit 510 is further configured to:

receive a second feedback message transmitted by a network device;

when the paging message carries the identifier information obtained based on the second bit except the at least one first bit of the first identifier, transmit a second paging response to the network device according to whether the second feedback message carries other bits except the first bit and the second bit; or when the paging message carries identifier information obtained based on a part of bits of the second identifier, transmit the second paging response to the network device according to whether the second feedback message carries the second identifier or other bits except the part of bits of the second identifier; or when the paging message carries identifier information calculated based on all bits of the second identifier, transmit the second paging response to the network device according to whether the second feedback message carries the second identifier.

The terminal device 500 according to the embodiment of the present application may implement the operations performed by the terminal device in the method of the embodiment of the present application. For brevity, details are not described herein again.

Figure 6:
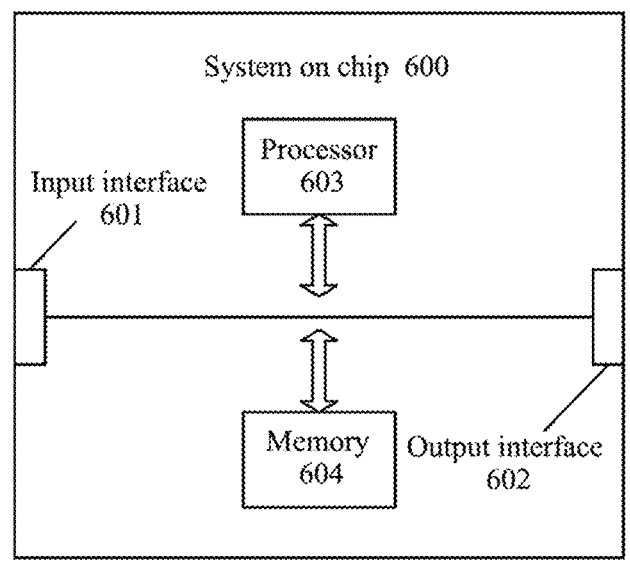
FIG. 6 is a schematic block diagram of a system on chip according to an embodiment of the present application.

FIG. 6 is a schematic structural diagram of a system on chip 600 according to an embodiment of the present application. The system on chip 600 of FIG. 6 includes an input interface 601, an output interface 602, the processor 603 and memory 604 can be connected by an internal communication connection line. The processor 603 is configured to execute code in the memory 604.

In an embodiment, when the code is executed, the processor 603 implements a method performed by a network device in a method embodiment. For brevity, details are not described herein again.

In an embodiment, when the code is executed, the processor 603 implements a method performed by a terminal device in a method embodiment. For brevity, details are not described herein again.

Figure 7:
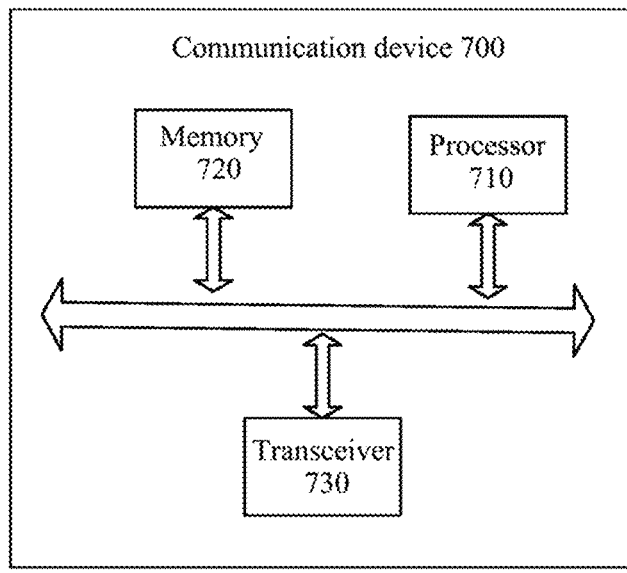
FIG. 7 is a schematic block diagram of a communication device according to an embodiment of the present application.

FIG. 7 is a schematic block diagram of a communication device 700 according to an embodiment of the present application. As shown in FIG. 7, the communication device 700 includes a processor 710 and a memory 720, where the memory 720 can store program code, and the processor 710 can execute the program code stored in the memory 720.

In an embodiment, as shown in FIG. 7, the communication device 700 can include a transceiver 730 that can be controlled by the processor 710 to perform external communication.

In an embodiment, the processor 710 can call the program code stored in the memory 720 to perform the corresponding operations of the network device in the method embodiment. For brevity, details are not described herein again.

In an embodiment, the processor 710 can call the program code stored in the memory 720 to perform the corresponding operations of the terminal device in the method embodiment. For brevity, details are not described herein again.

It should be understood that the processor of the embodiment of the present application may be an integrated circuit chip with signal processing capability. In the implementation process, each step of the foregoing method embodiments may be completed by an integrated logic circuit of hardware in a processor or an instruction in a form of software. The processor may be a general-purpose processor, a digital signal processor (DSP), an application specific integrated circuit (ASIC), a Field Programmable Gate Array (FPGA), or other programmable logic devices, discrete gates or transistor logic devices, discrete hardware components. The methods, steps, and logical block diagrams disclosed in the embodiments of the present application can be implemented or executed. The general purpose processor may be a microprocessor or any conventional processor or the like. The steps of the method disclosed in the embodiments of the present application may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory, and the processor reads information from the memory, and completes the steps of an above method with a combination of its hardware.

It is to be understood that the memory in the embodiments of the present application may be a volatile memory or a non-volatile memory, or may include both the volatile and the non-volatile memory. The non-volatile memory may be a read-only memory (ROM), a programmable read only memory (PROM), an erasable PROM, (EPROM), or an electrically EPROM (EEPROM) or a flash memory. The volatile memory can be a random access memory (RAM) that serves as an external cache. By way of illustration rather than limitation, many forms of RAM can be used, such as static random access memory (SRAM), dynamic RAM (DRAM), synchronous DRAM (SDRAM), double data rate SDRAM (DDR SDRAM), Enhanced SDRAM (ESDRAM), synchlink DRAM (SLDRAM) and direct Rambus RAM (DR RAM). It should be noted that the memories of the systems and methods described herein are intended to include, without being limited to, these and any other suitable types of memory.

The embodiment of the present application further provides a computer program product including instructions, when a computer runs the instructions of the computer program product, the computer executes the method of the foregoing method embodiments. Specifically, the computer program product can be run on the network device and the terminal device.

Those of ordinary skill in the art will appreciate that the elements and algorithm steps of the various examples described with reference to the embodiments disclosed herein can be implemented in electronic hardware or a combination of computer software and electronic hardware. Whether these functions are performed in hardware or software depends on the specific application and design constraints of the technical solution. A person skilled in the art can use different methods to implement the described functions for each particular application, but such implementation should not be considered to be beyond the scope of the present application.

A person skilled in the art can clearly understand that for the convenience and brevity of the description, for the specific working process of the system, the device and the unit described above, reference can be made to the corresponding process in the foregoing method embodiment, and details are not described herein again.

In the several embodiments provided by the present application, it should be understood that the disclosed system, apparatuses, and methods may be implemented in other manners. For example, the apparatus embodiments described above are merely illustrative. For example, the division of the units is only a logical function division. In actual implementation, there may be other division manners, for example, multiple units or components may be combined or may be integrated into another system, or some features may be ignored or not executed. In addition, the mutual coupling, direct coupling or communication connection shown or discussed may be an indirect coupling or communication connection through some interfaces, apparatuses or units, and may be in an electrical, mechanical or other form.

The units described as separate components may or may not be physically separated, and the components displayed as units may or may not be physical units, that is, the components may be located in one place, or may be distributed to multiple network units. Some or all of the units may be selected according to actual needs to achieve the purpose of the solution of the embodiment.

In addition, the respective functional units in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution may be embodied in the form of a software product essentially, or the part that contributes to the prior art or a part of the technical solution may be embodied in the form of a software product, where the computer software product is stored in a storage medium and includes several instructions to cause a computer device (which may be a personal computer, server, or network device, etc.) to perform all or part of the steps of the methods described in various embodiments of the present application. The foregoing storage medium includes: a USB flash drive, a mobile hard disk, a read-only memory (ROM), a random access memory (RAM), a magnetic disk, an optical disk, or the like, which can store program code.

The foregoing is only a specific embodiment of the present application, and the scope of protection of the present application is not limited thereto, and any person skilled in the art can easily think of changes or substitutions within the technical scope disclosed in the present application. And the changes and substitutions should be covered by the scope of protection of this application. Therefore, the scope of protection of the present application should depend on the scope of the claims.

What is claimed is:

1. A paging method, comprising:
   determining, by a terminal device, a paging time of the terminal device by using at least one first bit of a first identifier of the terminal device;
   receiving a paging message during the paging time;
   transmitting a first paging response when the paging message carries identifier information of the terminal device;
   wherein the identifier information is obtained based on a second bit, except the at least one first bit of the first identifier, or
   the identifier information is obtained based on a second identifier of the terminal device, wherein a length of the identifier information is shorter than the second identifier;
   wherein the method further comprises:
   receiving a feedback message transmitted by a network device;
   when the paging message carries the identifier information obtained based on the second bit except the at least one first bit of the first identifier, transmitting a second paging response to the network device according to whether the feedback message carries other bits except the first bit and the second bit; or
   when the paging message carries identifier information obtained based on a part of bits of the second identifier, transmitting the second paging response to the network device according to whether the feedback message carries the second identifier or other bits except the part of the bits of the second identifier; or
   when the paging message carries identifier information calculated based on all bits of the second identifier, transmitting the second paging response to the network device according to whether the feedback message carries the second identifier.

2. The method according to claim 1, wherein the identifier information is calculated based on at least a part of bits of the second identifier.

3. The method according to claim 1, wherein the identifier information is equal to a part of bits of the second identifier.

4. The method according to claim 1, wherein the first identifier is an international mobile subscriber identity (IMSI) and the identifier information is obtained based on at least one second bit of the IMSI of the terminal device.

5. The method according to claim 4, wherein the at least one first bit is a lowest bit of the first identifier; and the at least one second bit is a lowest bit, except the at least one first bit, of the first identifier.

6. The method according to claim 1, wherein the first identifier is an IMSI, and the second identifier is a serving temporary mobile subscriber identity (S-TMSI) allocated by a core network, and the identifier information is obtained based on the S-TMSI of the terminal device.

7. A network device, comprising:
   a processor, a transceiver and a computer-readable medium for storing program codes,
   wherein when executed by the processor, the program codes cause the processor to: determine a paging time of a first terminal device by using at least one first bit of a first identifier of the first terminal device; and
   the program codes cause the transceiver to transmit a paging message during the paging time;
   wherein the paging message carries identifier information of the first terminal device, and the identifier information is obtained based on at least one second bit, except the at least one first bit, of the first identifier of the first terminal device; or,
   the identifier information is obtained based on a second identifier of the first terminal device, wherein a length of the identifier information is shorter than the second identifier of the first terminal device;
   wherein the program codes further cause the transceiver to:
   transmit a feedback message to the first terminal device;
   when the paging message carries the identifier information obtained based on the second bit except the at least one first bit of the first identifier, receive a second paging response transmitted by the first terminal device according to whether the feedback message carries other bits except the first bit and the second bit; or when the paging message carries identifier information obtained based on a part of bits of the second identifier, receive the second paging response transmitted by the first terminal device according to whether the feedback message carries the second identifier or other bits except the part of the bits of the second identifier; or when the paging message carries identifier information calculated based on all bits of the second identifier, receive the second paging response transmitted by the first terminal device according to whether the feedback message carries the second identifier.

8. The network device according to claim 7, wherein the identifier information is calculated based on at least a part of bits of the second identifier of the first terminal device.

9. A terminal device, comprising:
a processor, a transceiver and a computer-readable medium for storing program codes,
wherein when executed by the processor, the program codes cause the processor to determine a paging time of the terminal device by using at least one first bit of a first identifier of the terminal device; and
the program codes further cause the transceiver to: receive a paging message during the paging time; and
transmit a first paging response when the paging message carries identifier information of the terminal device;
wherein the identifier information is obtained based on a second bit, except the at least one first bit, of the first identifier, or
the identifier information is obtained based on a second identifier of the terminal device, wherein a length of the identifier information is shorter than the second identifier;

wherein the program codes further cause the transceiver to:
receive a feedback message transmitted by a network device;
when the paging message carries the identifier information obtained based on the second bit except the at least one first bit of the first identifier, transmit a second paging response to the network device according to whether the feedback message carries other bits except the first bit and the second bit; or
when the paging message carries identifier information obtained based on a part of bits of the second identifier, transmit the second paging response to the network device according to whether the feedback message carries the second identifier or other bits except the part of the bits of the second identifier; or
when the paging message carries identifier information calculated based on all bits of the second identifier, transmit the second paging response to the network device according to whether the feedback message carries the second identifier.

10. The terminal device according to claim 9, wherein the identifier information is calculated based on at least a part of bits of the second identifier.

11. The terminal device according to claim 9, wherein the identifier information is equal to a part of bits of the second identifier.

12. The terminal device according to claim 9, wherein the first identifier is an international mobile subscriber identity (IMSI) and the identifier information is obtained based on at least one second bit of the IMSI of the terminal device.

13. The terminal device according to claim 12, wherein the at least one first bit is a lowest bit of the first identifier; and the at least one second bit is a lowest bit, except the at least one first bit, of the first identifier.

14. The terminal device according to claim 9, wherein the first identifier is an IMSI, and the second identifier is a serving temporary mobile subscriber identity (S-TMSI) allocated by a core network, and the identifier information is obtained based on the S-TMSI of the terminal device.

* * * * *